(12) United States Patent
Hook et al.

(10) Patent No.: US 6,223,832 B1
(45) Date of Patent: May 1, 2001

(54) CONSTANT PRESSURE SCRAPER SYSTEM WITH ADJUSTMENT

(75) Inventors: Richard Wayne Hook; Richard David Zaun, both of West Des Moines; Garrett Lee Goins, Rhodes, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/325,481

(22) Filed: Jun. 3, 1999

(51) Int. Cl.[7] ............................. A01B 15/16; A01B 23/06
(52) U.S. Cl. ............................. 172/565; 172/566
(58) Field of Search .................... 172/186, 461, 172/509, 547, 558, 559, 563, 565, 566, 610; 111/52, 69, 82

(56) References Cited

U.S. PATENT DOCUMENTS

| | | | | |
|---|---|---|---|---|
| 576,407 | * | 2/1897 | Lindgren | 172/565 |
| 827,375 | * | 7/1906 | Kennedy et al. | 172/565 |
| 1,016,807 | | 2/1912 | White . | |
| 1,020,530 | | 3/1912 | White . | |
| 1,206,930 | | 12/1916 | Sharp . | |
| 1,207,672 | * | 12/1916 | Warne | 172/565 |
| 1,230,716 | * | 6/1917 | Johnson | 172/565 |
| 1,289,989 | | 12/1918 | White . | |
| 1,512,257 | * | 10/1924 | White | 172/565 |
| 1,534,489 | * | 4/1925 | Barnes | 172/565 |
| 1,558,320 | * | 10/1925 | White | 172/563 |
| 1,648,381 | | 11/1927 | Flatley . | |
| 1,834,485 | * | 12/1931 | Bissell | 172/566 |
| 2,353,790 | | 7/1944 | Seaholm | 97/224 |
| 3,438,448 | * | 4/1969 | Richey | 172/558 |
| 4,008,770 | | 2/1977 | Boone et al. | 172/566 |
| 4,127,179 | * | 11/1978 | Heersink et al. | 172/565 |
| 4,333,535 | * | 6/1982 | Hentrich, Sr. | 172/566 |
| 4,407,372 | * | 10/1983 | Rozeboom | 172/572 |
| 4,492,272 | * | 1/1985 | Jensen | 172/178 |
| 5,065,681 | | 11/1991 | Hadley | 111/55 |
| 5,727,342 | * | 3/1998 | Horton | 37/468 |
| 5,855,246 | | 1/1999 | Bruce | 172/604 |

FOREIGN PATENT DOCUMENTS

| | | |
|---|---|---|
| 36 26 271 | 3/1988 | (DE) . |
| 2 371 130 | 6/1978 | (FR) . |

OTHER PUBLICATIONS

"Walker Disk Scraper", sales brochure, pp. 1 and 2, Sep. 1979.

* cited by examiner

*Primary Examiner*—Robert E. Pezzuto
*Assistant Examiner*—Nathan Mammen

(57) ABSTRACT

A disk scraper system for an agricultural implement includes a tubular member slidably supported by the implement frame adjacent a gang assembly having a plurality of disks. Scrapers are fixed to the member and project into scraping relationship with the disks to remove dirt and debris from the surfaces of the disks. A hydraulic cylinder is connected between the frame and the tubular member and connected through a pressure control valve assembly to a source of fluid under pressure to bias the member so the scrapers are urged into scraping relationship relative to the disks. The pressure control valve assembly may be remotely adjustable to vary the scraper pressure on-the-go as conditions change. The system maintains the selected scraper bias even as the gang assembly moves vertically and from side to side relative to the frame with changing contour and soil conditions.

9 Claims, 3 Drawing Sheets

CONSTANT PRESSURE SCRAPER SYSTEM WITH ADJUSTMENT

BACKGROUND OF THE INVENTION

1) Field of the Invention

The present invention relates generally to tillage equipment and, more specifically, to a disk scraper system for a harrow or other implement having a plurality of disks.

2) Related Art

Typically, disk harrows include a main frame with several disk gang assemblies suspended for limited flexibility with respect to each other and the main frame. Each gang assembly comprises a plurality of equally spaced disks mounted on an axle for rotation about a common axis. The axle is supported at opposite ends by C-shaped spring elements to allow the disk gangs to flex with the contour of the landscape as the implement is drawn by a tractor. Depending on soil and crop conditions, an accumulation of soil and residue will adhere to the disks and adversely affect disk operation. To eliminate the accumulation of soil and residue, a disk scraper which is often mounted from the main frame is biased by a spring into contact with the surface of the disk. As the disk rotates, the scraper continuously removes the soil/residue accumulations.

During disk operation in the field, the disk gangs flex with ground contour changes and oscillate laterally as different soils act upon the disk surfaces. When the lateral oscillations occur, the disk mounting arrangement causes the disk scraper pressure against the disks to increase or decrease depending on the magnitude and direction of the oscillation. Since the disk scrapers and biasing means are mounted from the main frame and the disk gangs move with respect to said frame, disk scraper pressure can vary considerably. As the disk gang shifts laterally away from the scraper, biasing force from the spring is reduced resulting in a non-clean disk surface. As the disk gang shifts laterally the opposite direction, an excessive force is applied to the disk surface. The force is usually more than necessary to scrape the disk clean and results in excessive wear and added draft requirements. Also, as the disk gang shifts laterally away from or toward the scrapers, the preferred angular relationship between the scraper and blade is not maintained.

Attempts to address disk scraper problems include mounting the scrapers directly to the disk gang assembly so the scrapers move with the assembly. However, such a design requires mounting brackets and hardware connected between the disk scrapers and the disk gang, thereby hindering trash and soil flow and providing additional surfaces where material can accumulate. Additionally, in current disk scraper mounting designs, changing the bias of the scraper requires changing springs or increasing or decreasing the number of springs. These changes can be very time consuming and require additional parts and expense.

BRIEF SUMMARY OF THE INVENTION

It is therefore an object of the present invention to provide an improved disk scraper system which overcomes most or all of the aforementioned problems. It is another object to provide such a system which maintains a constant scraper bias, even when the disks move relative to the implement frame, and which is easily adjustable to vary the scraper bias.

It is yet a further object of the present invention to provide an improved disk scraper system which does not require biasing springs. It is yet another object to provide such a system which provides a generally constant scraper pressure, that pressure being adjustable from a location remote from the scrapers.

It is yet another object of the present invention to provide an improved scraper system which requires no springs and which is easily adjusted for changing conditions. It is another object to provide such a system wherein scraper pressure setting may be adjusted in the field on-the-go.

It is a further object of the present invention to provide an improved scraper system which provides a generally constant scraper pressure against a disk gang assembly, even as the disk gang assembly moves relative to the disk frame in changing ground contours and soil and trash conditions. It is yet a further object to provide such a system which provides constant pressure without need to connect the scrapers directly to the to the disk gang assembly.

A scraper system constructed in accordance with the teachings of the present invention includes a tubular member slidably supported by an implement frame adjacent a gang assembly having a plurality of disks. Scrapers are fixed to the member and project into scraping relationship with the disks to remove dirt and debris from the surfaces of the disks. A hydraulic cylinder is connected between the frame and the tubular member and connected through a pressure control valve assembly to a source of fluid under pressure to bias the member so the scrapers are urged towards the disks. The pressure control valve assembly is adjustable to remotely vary the scraper pressure as conditions change. The system maintains a preselected scraper bias independently of relative movement between the frame and the gang assembly, for example, of the type that commonly occurs when a C-spring supported disk gang assembly moves vertically and from side to side relative to the frame.

A constant pressure is maintained by the scraper system without need to mount the scrapers directly to the disk gang assembly, thereby eliminating mounting hardware that would otherwise present additional surfaces that hinder soil and residue flow and collect dirt and debris. Biasing springs are eliminated, and the scraper pressure can be changed easily and very quickly in the field, without requiring spring changes or other time-consuming adjustments. The constant scraper pressure is maintained, even when there is considerable relative motion between the disk gang assembly and the implement frame. The system is simple in construction and easy to attach and adjust.

These and other objects, features and advantages of the present invention will become apparent to one skilled in the art upon reading the following detailed description in view of the drawings.

BRIEF DESCRIPTION OF THE DRAWINGS

FIG. 4 is a schematic of the hydraulic control for the scraper system.

DETAILED DESCRIPTION OF THE DRAWINGS

Figure 1:
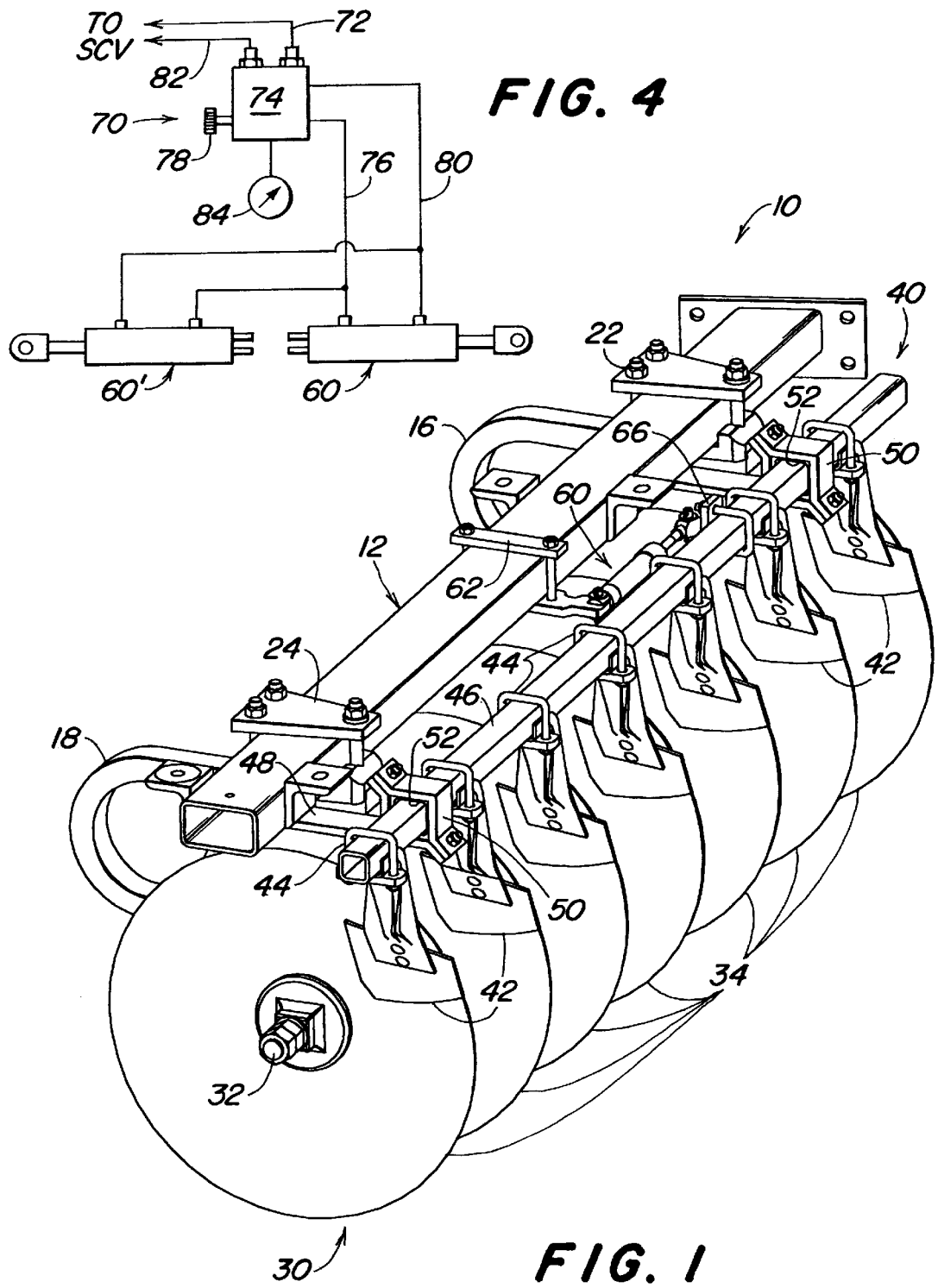
FIG. 1 is a rear perspective view of a portion of a disk harrow with a scraper system attached.

Referring now to FIG. 1, therein is shown a portion of a disk harrow 10 having a tubular frame 12 adapted for forward movement over soil where crop residue or other trash is present. C-springs 16 and 18 are connected by brackets 22 and 24 to the frame 12 and support a disk gang assembly 30 from the frame 12. The assembly 30 includes an axle 32 extending generally parallel to the frame 12 and supporting a plurality of transversely spaced disk blades 34 for rotation in unison with the axle. As the assembly 30 is moved forwardly through the soil, dirt and debris tend to build up on the surfaces of the blades 34 and between the blades. This dirt and debris must be removed to maintain good soil working and trash sizing characteristics.

Figure 2:
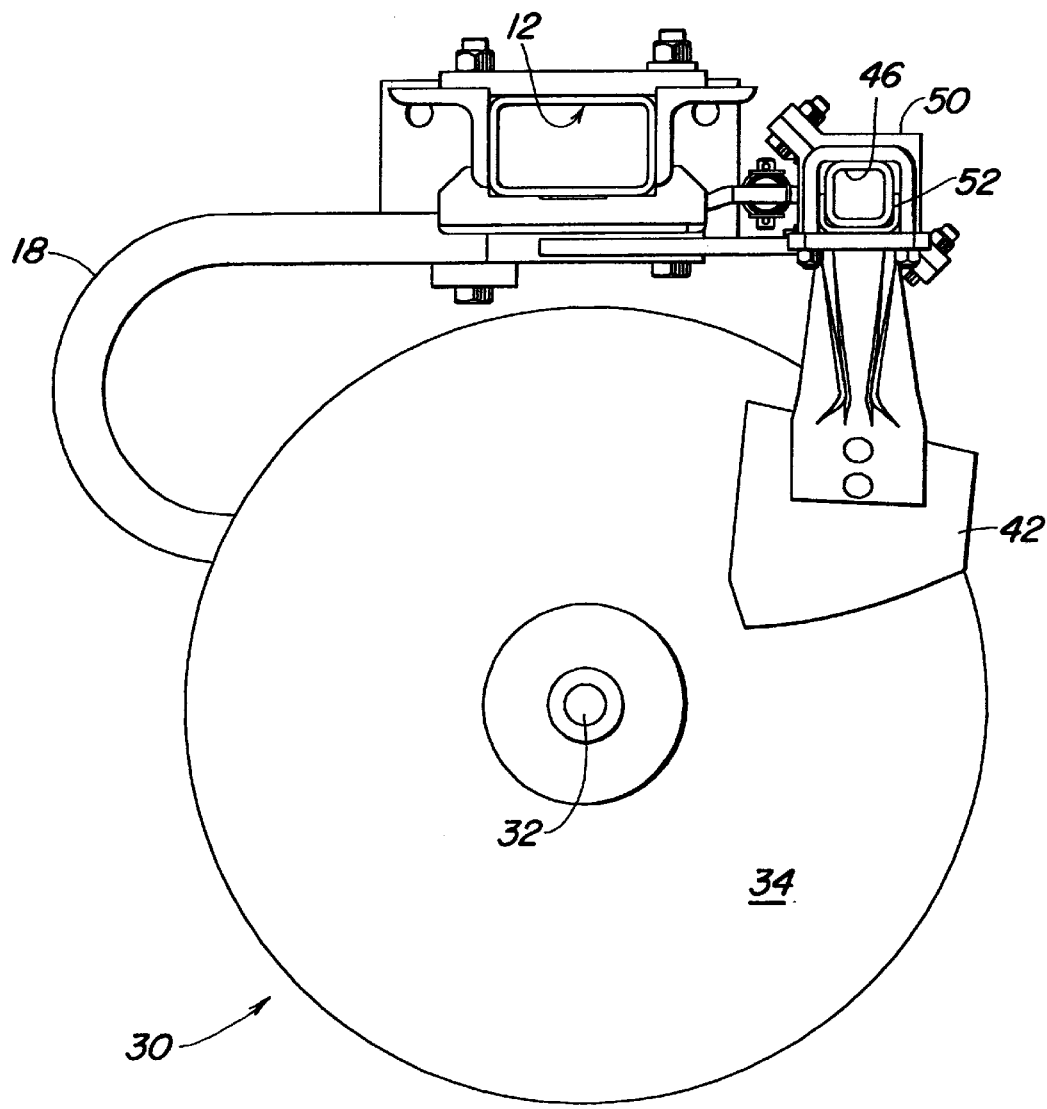
FIG. 2 is an enlarged side view of the disk harrow portion shown in FIG. 1.
Figure 3:
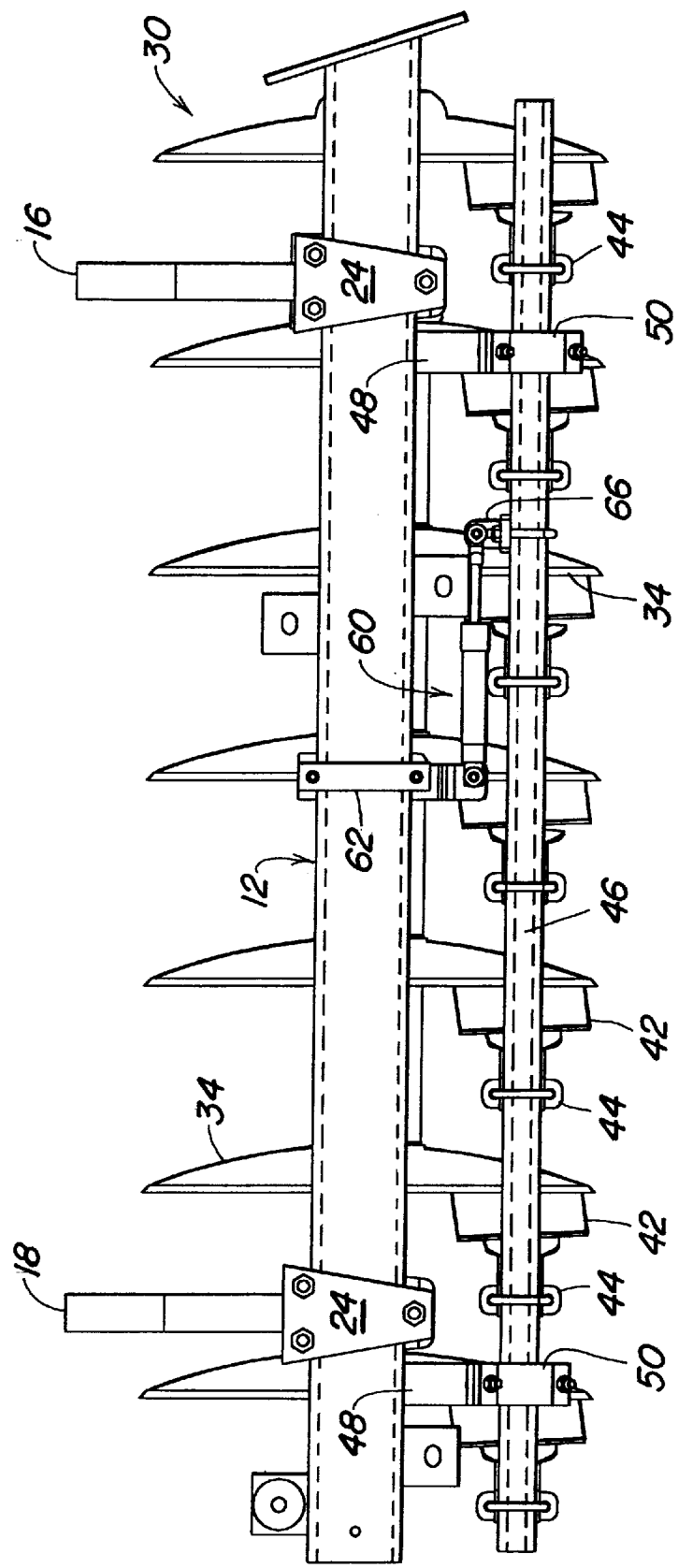
FIG. 3 is a top view of the disk harrow portion of FIG. 1.

To remove dirt and debris, a scraper system, shown generally at 40, is supported from the frame 12 including scrapers 42 projecting towards the concave surface of the disk blades 34 near the outer periphery of the blades. Each scraper 42 is connected by a U-bolt assembly 44 or other conventional mounting structure to a tubular member 46. The tubular member 46 is slidably received by a pair of transversely spaced, rearwardly projecting support brackets 48 connected at their forward ends to the frame 12. The support bracket 48 includes an aft angle portion 50 which is bolted to the remainder of the bracket and a bearing 52 (FIG. 2) for reducing friction and wear between the member 46 and the bracket. The scrapers 42 are bolted to the member 46 in uniform transverse relationship with spacings generally equal to the spacings between the disk blades 34. The assembly may then be attached by first rotating the angle portion 50 from the position shown, placing the member 46 on the support brackets, and then reattaching the angle portions. The brackets 50 and bearings 52 slidably support the member 46 and prevent rotation of the member about its elongate axis which, under normal operating conditions, extends generally parallel to the axis of the axle 32.

A motor which is shown as a small double acting hydraulic cylinder 60 includes a base end connected to the frame 12 by a bracket 62 and a rod end connected by a bracket 66 to the tubular member 46. The cylinder 60, which is oriented generally parallel to the member 46, slides the member longitudinally in the brackets 48 with extension and retraction.

An adjustable motor or cylinder control 70 (FIG. 4) is located conveniently relative to the operator and is connected between a source of hydraulic fluid on the towing vehicle and the cylinder 60. A supply side hydraulic line 72 from the tractor selective control valve (scv) feeds an adjustable pressure valve 74 which, in turn, provides adjustable pressure via line 76 to the base end of the cylinder 60 causing the cylinder to extend and bias the scrapers 42 into scraping relationship with the blades 34. When scraping relationship is achieved, the cylinder control valve 70 will maintain a constant pressure to cylinders 60. This allows scraper blades 42 to move laterally with disk blades 34 and maintain a constant pressure between scrapers 42 and disk blades 34. By turning a pressure adjustment knob 78 on the valve 74, the operator can conveniently change the bias to match field conditions. The rod end of the cylinder 60 is connected via line 80, valve 74 and return line 82 to sump through the scv. Additional cylinders 60' are connected in parallel with the cylinder 60 to control additional scraper systems 40. A pressure gauge 84 provides a visual indication to the operator of the scraper bias. By reversing the pressure with the scv or by placing the scv in the float position, the scrapers will move to a non-contact position to reduce drag and wear when no disk scraping is necessary as is the case, for example, when disking in loose, dry soil conditions. Thereafter, placing the scv in the detent position for pressurizing the line 76 again extends the cylinder 60 to slide the member 46 to the scraping position with the scraper bias determined by the adjustment of the knob 78. As the disk gang assembly rocks relative to the frame, the cylinder 60 and the control 70 maintain a generally constant bias, sliding the member 46 as necessary. If the scraper pressure begins to exceed the set level, the valve 74 allows the cylinder to retract and the member 46 to slide to the left (as seen in FIG. 1). If scraper pressure begins to decrease, the valve 74 extends the cylinder 60 until the pressure reaches the selected level. The valve 74 can be placed for easy access by the operator for on-the-go adjustment of the constant scraper pressure setting to adjust the scrapers for varying field conditions. Alternatively, a modified valve 74 can be placed on the implement and controlled electronically from the tractor cab for the on-the-go adjustment.

Having described the preferred embodiment, it will become apparent that various modifications can be made without departing from the scope of the invention as defined in the accompanying claims.

What is claimed is:

1. An agricultural implement including a plurality of disks supported for rotation about an axis from a disk frame for tilling soil and sizing trash, the disks supported by a cushion member from the disk frame and moveable relative to the disk frame vertically and from side to side with changes in soil conditions, an elongated support slidably mounted from the disk frame adjacent the disks and movable relative to the disks, a plurality of scrapers connected to the support and extending toward the disks, a hydraulic cylinder connected between the support and the disk frame for moving the support relative to the disk frame and biasing the scrapers into scraping relationship with the disks to thereby remove soil and trash from the disks, and an adjustable control valve assembly connected to the cylinder at a location remote from the support and to a source of hydraulic fluid under pressure to move the support in response to changes in the biasing, the control valve assembly including an adjustable pressure control located remotely from the disks to automatically maintain a preselected scraper bias as the disks move vertically and from side to side relative to the disk frame with changing ground and debris conditions, the motor control providing adjustability of the preselected bias on-the-go from a location remote from the disks.

2. The implement of claim 1 wherein the support includes a tube, and further including a bracket connected to the frame and slidingly supporting the tube, and wherein the motor is connected between the tube and the frame.

3. The implement of claim 2 wherein the tube is slidable within a portion of the bracket for movement in a direction parallel to the axis of rotation of the disks.

4. An agricultural implement including a plurality of disks supported for rotation about an axis from a disk frame for tilling soil and sizing trash, a cushion support member providing limited movement of the disks vertically and from side to side relative to the disk frame with change in soil conditions and soil contour, an elongated scraper support mounted from the frame adjacent the disks and movable relative to the frame and the disks, a plurality of scrapers connected to the scraper support and projecting into scraping relationship with the disks, wherein the disks move relative to the scrapers as the disks move vertically and from side to side, a hydraulic cylinder operably connected between the frame and the scraper support and extendible and retractable to move the scraper support relative to the disk frame and bias the scrapers into scraping relationship with the disks, a hydraulic control connected to the cylinder and to a source of hydraulic fluid under pressure, the hydraulic control including an adjustable pressure control adjustable remotely from the cylinder to vary the scraper pressure on-the-go and wherein the motor control is responsive to changes in the biasing of the scrapes for operating the motor to move the scraper support and automatically maintain a preselected bias of the scrapers towards the disks as the disks move relative to the disk frame.

5. The implement as set forth in claim 4 including a pressure gauge providing an indication of the bias.

6. The implement as set forth in claim 4 further comprising a second cylinder connected in parallel with the hydraulic cylinder.

7. The implement as set forth in claim 4 wherein in the disks are supported for rotation about an axis and the scraper support is movable in a path extending generally parallel to the axis.

8. The implement as set forth in claim 1 wherein the disks are supported in a disk gang arrangement and the cushion support comprises a C-shaped spring connected between the frame and the disk gang arrangement.

9. A disk scraper system for an agricultural disk implement adapted for movement in a forward direction over the ground, the disk implement having a frame, a cushion support connected to the frame, and a ground working disk gang assembly with a plurality of disks connected to the cushion support for movement vertically and from side to side relative to the frame as the disk gang assembly works the ground, the disk scraper system including:

a tubular member slidably supported by the frame adjacent the gang assembly; a plurality of scrapers are connected to the tubular member and projecting into scraping relationship with the disks to remove dirt and debris from the disks, wherein the disks move relative to the scrapers as the disk gang assembly moves vertically and from side to side relative to the frame;

a hydraulic cylinder connected between the frame and the tubular member and extending generally parallel to the tubular member;

a control valve assembly connected between a source of fluid under pressure and the hydraulic cylinder and operating the hydraulic cylinder to bias the scrapers into scraping relationship with the disks with substantially constant bias as the disk gang assembly moves relative to the frame, the control valve assembly including an adjustable pressure control remotely adjustable to vary the scraper pressure on-the-go and maintain a selected scraper bias even as the gang assembly moves vertically and from side to side relative to the frame with changing ground and debris conditions; and wherein the source of fluid under pressure includes pressure reversing control to reverse the bias and move the scrapers out of contact with the disks.

* * * * *